US012572566B2

(12) United States Patent
Ducott, III et al.

(10) Patent No.: US 12,572,566 B2
(45) Date of Patent: *Mar. 10, 2026

(54) SHARING INFORMATION BETWEEN NEXUSES THAT USE DIFFERENT CLASSIFICATION SCHEMES FOR INFORMATION ACCESS CONTROL

(71) Applicant: Palantir Technologies Inc., Denver, CO (US)

(72) Inventors: Richard Allen Ducott, III, Burlingame, CA (US); John Kenneth Garrod, Palo Alto, CA (US); Khan Tasinga, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/544,177

(22) Filed: Dec. 18, 2023

(65) Prior Publication Data

US 2024/0134885 A1 Apr. 25, 2024

Related U.S. Application Data

(63) Continuation of application No. 17/124,093, filed on Dec. 16, 2020, now Pat. No. 11,847,140, which is a
(Continued)

(51) Int. Cl.
| | |
|---|---|
| *G06F 16/27* | (2019.01) |
| *G06F 16/182* | (2019.01) |
| *G06F 16/21* | (2019.01) |
| *G06F 16/2457* | (2019.01) |
(Continued)

(52) U.S. Cl.
CPC ........ *G06F 16/285* (2019.01); *G06F 16/1837* (2019.01); *G06F 16/213* (2019.01); *G06F 16/24578* (2019.01); *G06F 16/27* (2019.01); *G06F 16/273* (2019.01); *G06F 16/8358* (2019.01); *G06F 16/951* (2019.01);
(Continued)

(58) Field of Classification Search
CPC ....... G06F 16/27; G06F 16/273; G06F 16/285
See application file for complete search history.

(56) References Cited

U.S. PATENT DOCUMENTS

| | | | |
|---|---|---|---|
| 7,788,227 B1 * | 8/2010 | Nettleton | ................ G06F 9/541 |
| | | | 717/174 |
| 8,060,534 B1 | 11/2011 | Ansari et al. | |
(Continued)

*Primary Examiner* — Tarek Chbouki
(74) *Attorney, Agent, or Firm* — Duane Morris LLP

(57) ABSTRACT

A computer-implemented method comprises obtaining export data representing a first classification in a first database that is to be imported into a second database, the first classification including a first set of classification markings that correspond to a first classification scheme identifier of the first database and that determine access to the first database and including a first plurality of origin classifications, each original classification of the first plurality of origin classifications including a classification scheme identifier; determining that a specific original classification of the first plurality of origin classifications has a specific classification scheme identifier matching a second classification scheme identifier of the second database; importing the specific original classification into the second database as an imported classification.

20 Claims, 10 Drawing Sheets

Related U.S. Application Data continuation of application No. 15/830,326, filed on Dec. 4, 2017, now Pat. No. 10,891,312, which is a continuation of application No. 14/726,204, filed on May 29, 2015, now Pat. No. 9,836,523, which is a continuation of application No. 13/657,684, filed on Oct. 22, 2012, now Pat. No. 9,081,975.

(51) Int. Cl.

| | | |
|---|---|---|
| *G06F 16/28* | (2019.01) | |
| *G06F 16/835* | (2019.01) | |
| *G06F 16/951* | (2019.01) | |
| *G06F 21/60* | (2013.01) | |
| *G06F 21/62* | (2013.01) | |
| *H04L 9/40* | (2022.01) | |

(52) U.S. Cl.

CPC ........ *G06F 21/604* (2013.01); *G06F 21/6218* (2013.01); *G06F 21/6236* (2013.01); *H04L 63/105* (2013.01); *G06F 2221/2141* (2013.01)

(56) References Cited

U.S. PATENT DOCUMENTS

| | | | |
|---|---|---|---|
| 8,364,631 B1 | 1/2013 | Gutti et al. | |
| 8,533,169 B1 | 9/2013 | Bailey et al. | |
| 8,738,569 B1 * | 5/2014 | Choi ..................... | G06F 16/214 |
| | | | 707/619 |
| 10,891,312 B2 | 1/2021 | Ducott, III et al. | |
| 2002/0029376 A1 * | 3/2002 | Ambrose ............... | G06F 9/451 |
| | | | 717/113 |
| 2005/0050010 A1 | 3/2005 | Linden | |
| 2005/0076030 A1 | 4/2005 | Hada et al. | |
| 2005/0187973 A1 * | 8/2005 | Brychell ................. | G06F 16/86 |
| 2007/0067302 A1 | 3/2007 | Bailey et al. | |
| 2007/0067361 A1 | 3/2007 | Bailey et al. | |
| 2007/0112851 A1 * | 5/2007 | Tomic ................... | G06F 40/226 |
| 2007/0299858 A1 * | 12/2007 | Norcott ................ | G06F 16/211 |
| | | | 707/999.102 |
| 2008/0235271 A1 * | 9/2008 | Wang ................... | G06F 16/289 |
| 2009/0037769 A1 * | 2/2009 | Babkin ............. | G06F 16/24568 |
| | | | 714/15 |
| 2009/0248671 A1 * | 10/2009 | Maruyama ........... | G06F 16/353 |
| | | | 707/999.005 |
| 2010/0138398 A1 * | 6/2010 | Yoshizawa .............. | G06F 16/23 |
| | | | 707/812 |
| 2013/0085991 A1 * | 4/2013 | Welden ................. | G06F 16/213 |
| | | | 707/634 |
| 2014/0068743 A1 * | 3/2014 | Marcus .............. | H04L 63/0815 |
| | | | 726/8 |
| 2014/0149461 A1 | 5/2014 | Wijayaratne et al. | |
| 2014/0324834 A1 | 10/2014 | Hada et al. | |

* cited by examiner

FIG. 1

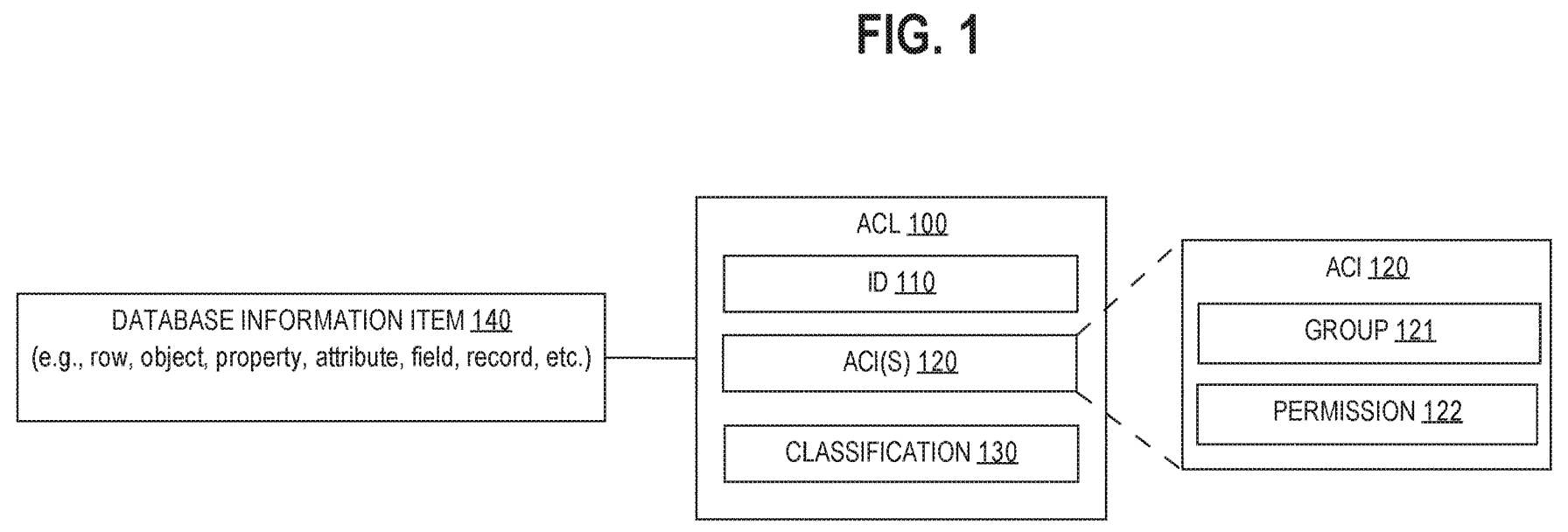

ACL 120

GROUP 121

PERMISSION 122

ACL 100

ID 110

ACI(S) 120

CLASSIFICATION 130

DATABASE INFORMATION ITEM 140
(e.g., row, object, property, attribute, field, record, etc.)

START

DETERMINE OWN CLASSIFICATION SCHEME — 310

DETERMINE CLASSIFICATION MARKINGS — 320

FORMAT CLASSIFICATION MARKINGS — 330

DETERMINE ORIGIN CLASSIFICATIONS — 340

CREATE NEW ORIGIN CLASSIFICATION — 350

FORMAT EXPORT DATA — 360

EXPORT CLASSIFICATION AS EXPORT DATA — 370

END

FIG. 4

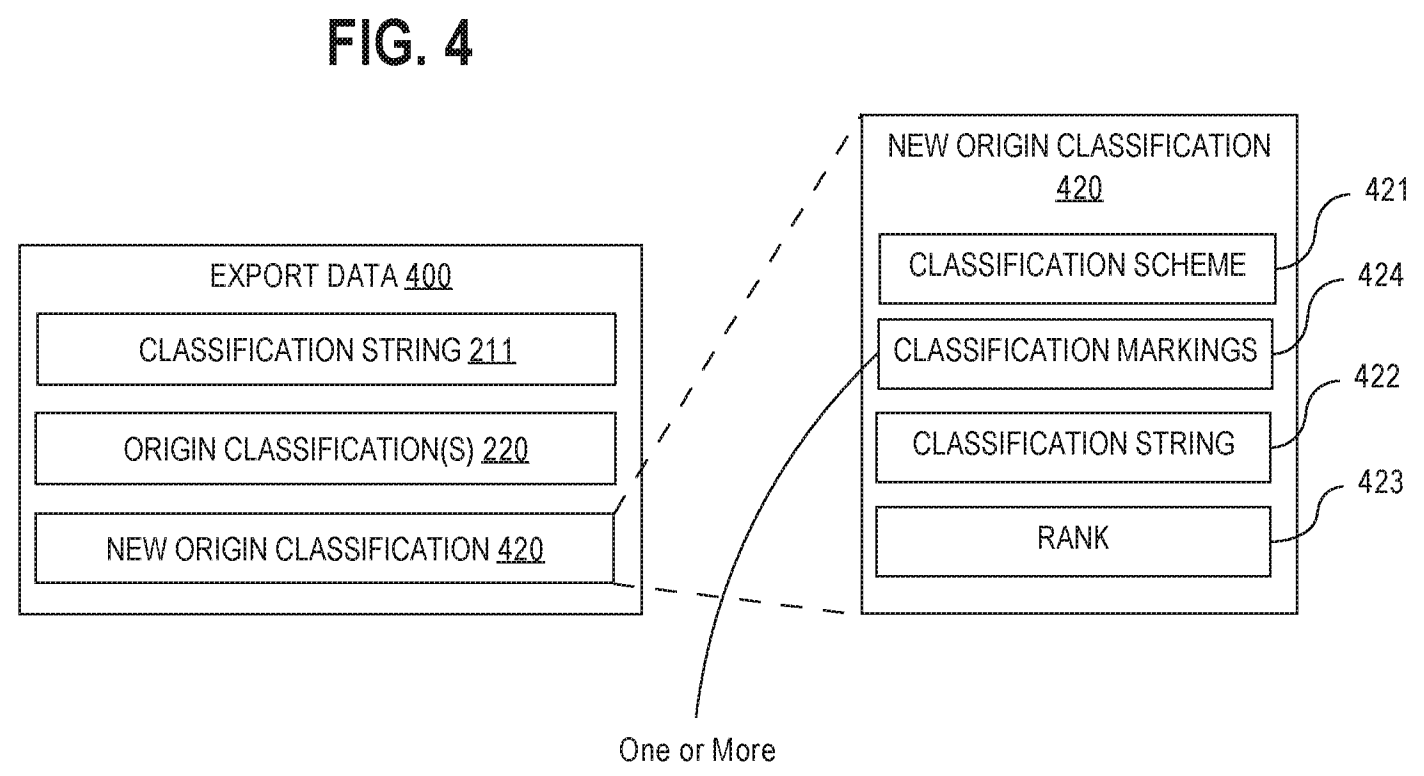

NEW ORIGIN CLASSIFICATION
420

CLASSIFICATION SCHEME — 421

CLASSIFICATION MARKINGS — 424

CLASSIFICATION STRING — 422

RANK — 423

EXPORT DATA 400

CLASSIFICATION STRING 211

ORIGIN CLASSIFICATION(S) 220

NEW ORIGIN CLASSIFICATION 420

One or More

|       | S1       | S2 | S3 | S4 |
|-------|----------|----|----|----|
| Rule1 | U//FOUO →▲ | R  |    |    |
| Rule2 |          | R →▲ | C  |    |
| Rule3 | U//FOUO ──│ |  | C →▲ | C  |
| Rule4 |          |    | C →▲ | C  |

FIG. 10

SHARING INFORMATION BETWEEN NEXUSES THAT USE DIFFERENT CLASSIFICATION SCHEMES FOR INFORMATION ACCESS CONTROL

PRIORITY CLAIM

This application claims the benefit under 35 U.S.C. § 120 as a Continuation of U.S. patent application Ser. No. 17/124, 093, filed Dec. 16, 2020, which is as a Continuation of U.S. patent application Ser. No. 15/830,326, filed Dec. 4, 2017, now U.S. Pat. No. 10,891,312, issued Jan. 12, 2021, which is as a Continuation of U.S. patent application Ser. No. 14/726,204, filed May 29, 2015, now U.S. Pat. No. 9,836, 523, issued Dec. 5, 2017, which is as a Continuation of U.S. patent application Ser. No. 13/657,684, filed Oct. 22, 2012, now U.S. Pat. No. 9,081,975, issued Jul. 14, 2015, the entire contents of each of which are hereby incorporated by reference as if fully set forth herein, under 35 U.S.C. § 120. The applicant hereby rescinds any disclaimer of claim scope in the parent applications or the prosecution history thereof and advises the USPTO that the claims in this application may be broader than any claim in the parent applications.

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to systems and methods for sharing information between distributed computer systems connected to one or more data networks and, more particularly, to a system providing a method for sharing information between such computer systems where the computer systems use different classification schemes for information access control.

BACKGROUND

In a typical replication system, information is stored at each replication site of a group of replication sites, information changes may be made at any site of the group, and information changes made at one site are propagated to the rest of the group. A replication system typically either employs a "synchronous" replication scheme or an "asynchronous" replication scheme for propagating an information change made at one site to the rest of the sites in the group.

With typical synchronous replication schemes, each information change is applied at all sites in the group immediately or at none of the sites if one or more of the sites in the group cannot accept the information change. For example, one of the sites may be offline or unavailable. Many synchronous replication schemes are implemented using a two-phase commit protocol.

In contrast, with typical asynchronous replication schemes, an information change made at a site is immediately accepted at that site but propagation of the information change to other sites in the group may be deferred. Because propagation of information changes may be deferred, if one or more of the sites in the group are temporarily unavailable, the available sites in the group can continue to accept information changes until they can be propagated to the rest of the group. For this reason, a replication system employing an asynchronous replication scheme is typically considered to be more highly available than one employing a synchronous replication scheme. However, asynchronous replication brings with it the possibility of information change conflicts that occur as a result of concurrent conflicting information changes at different replication sites.

Computer databases are a common mechanism for storing information on computer systems at replication sites while providing access to the stored information to users. A typical database is an organized collection of information stored as "objects" or "records" having "properties" or "fields". As an example, a database of criminal suspects may have an object for each suspect where each object contains properties designating specifics about the suspect, such as eye color, hair color, height, sex, etc.

Operating on the actual database itself (i.e., the organized information actually stored on a storage device) there is typically a software-based database management system or DBMS that, among other operations, processes requests from users for access to information in the database. Users may interact indirectly with the DBMS through a database application that in turn interacts directly with the DBMS to provide high level database operations to users, such as analyzing, integrating, and visualizing database information. However, the distinction between DBMS and database application is not clear cut and functionality provided by one may be provided by the other. Consequently, in this description, the term "nexus" will be used to refer broadly to any software that operates directly or indirectly on the actual database itself. A nexus may include a DBMS, a database application or applications, or components thereof.

Each day more and more organizations and businesses base their operations on mission-critical nexuses that retrieve information in databases. As a result, carrying out the operations of the organization or business often requires many users at different levels within the organization or business to access information in the database. Because information in the database may be sensitive (e.g., social security numbers, troop locations, medical histories, etc.), organizations and business need to protect themselves against unauthorized access to the sensitive database information.

One possible approach for protecting against unauthorized access to sensitive information in a database is to label sensitive database information with a classification comprising one or more classification markings. A classification marking is data associated with sensitive information in a database that indicates a necessary classification marking a user must be authorized for in order to access the sensitive information. The possible classification markings are typically specific to a particular classification scheme and may be hierarchical according to authorization level. For example, one classification scheme may have as the highest classification marking, Top Secret (TS), followed by Secret (S), followed by Confidential (C), followed by Restricted (R), and finally Unclassified (U). A user authorized for classification marking Secret (S) can access sensitive information with a classification marking of Secret (S), Confidential (C), Restricted (R), or Unclassified (U) but not Top Secret (TS). The foregoing classification markings are NOTIONAL ONLY and provided solely for example purposes.

Today, businesses and organizations need to share sensitive database information not only with users within their business or organization but also with other businesses and organizations. Unfortunately, different businesses and organizations may use different classification schemes for information access control. Further, some businesses and organizations may not use a classification scheme at all. With regard to database replication, this poses a special set of problems. In particular, a classification marking under one classification scheme may have no inherent equivalent in another information access control scheme. Nevertheless, it is desirable to provide support for replication of sensitive information between databases the use different classification schemes. It is also desirable to provide support for replication of sensitive information between a database that uses a classification scheme for information access control and one that does not. Given these expectations, that is great interest in providing a replication solution for sharing sensitive information between nexuses that use different classification schemes for information access control.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF DRAWINGS

In the drawings:

FIG. 1 is a block diagram of a possible access control list.

FIG. 4 is a block diagram of possible export data.

FIG. 10 is a block diagram of a sample computer system on which embodiments of the present invention may be implemented.

DETAILED DESCRIPTION

Introduction

Figure 2:
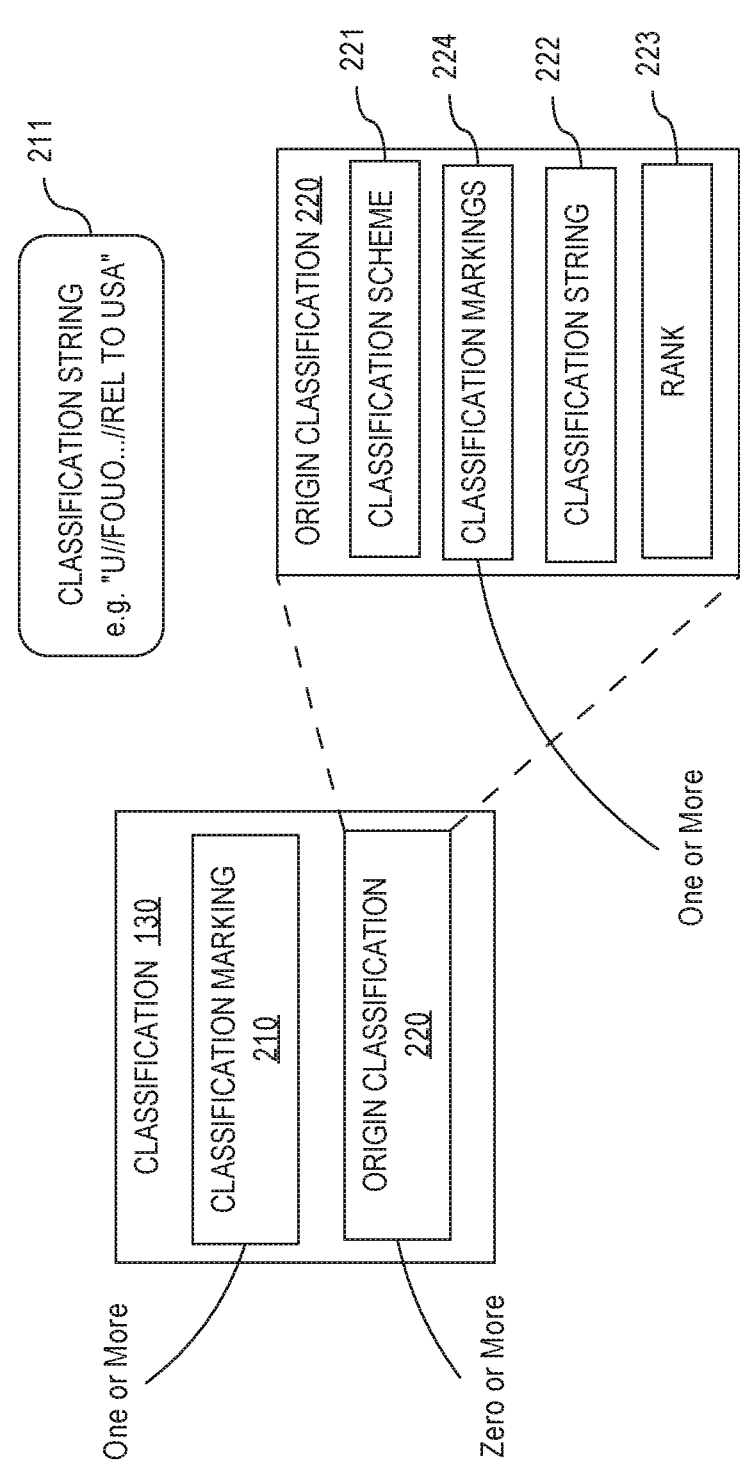
FIG. 2 is a block diagram of a possible classification.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first set could be termed a second set, and, similarly, a second set could be termed a first set, without departing from the scope of the present invention. The first set and the second set are both sets, but they are not the same set.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Statement Regarding Use of Classification Markings

All classification markings (e.g., TOP SECRET (TS)) in this document and the accompanying drawings are NOTIONAL and are used only for purposes of describing examples.

Introduction to Origin Classifications

A classification includes a set of one or more classification markings according to a classification scheme. A classification may be associated with an access controlled information item (e.g., an object, a record, a property, a field, etc.) in a database through an access control list. For example, the classification may be an item on an access control list associated with the database information item. The access control list may also contain other access control items for group-based or role-based access control.

According to one access control semantic of a classification associated with a database information item in a database, a user must be authorized for each and every classification marking in the set of classification markings in order to access the information item in that database. Each database in a replication group may use a different classification scheme for information access control and some of the databases may not use a classification scheme at all. Consequently, a user that can access an information item in one database of the replication group may not be able to access to the same information item in another database of the replication group.

In this description, a replication group refers to a group of databases that participate in the replication of one or more database information items over to a peer-to-peer replication topology. Each database in the group is operatively coupled to a nexus that accesses that database either directly or indirectly (i.e., through a DBMS). The nexus also conducts replication operations with its peers.

The needs discussed in the Background and other needs are addressed with the introduction of the notion of an "origin classification". An origin classification represents a classification as it appeared in a database of the replication group when the classification was exported from that database as part of replicating database information over the replication topology. The database from which the classification was exported is referred to herein as the origin database of the origin classification. In some embodiments, an origin classification includes a unique identifier of the classification scheme used by the origin database, a concise representation of the classification exported from the origin database, and a rank.

Origin classifications may be used within a replication system to facilitate translation of classification markings between peer databases that use different classification schemes. In particular, the use of origin classifications allows a replication system to support the replication invariant: if a classification C with the set of classification markings {M} under classification scheme S is exported from database D during replication, then if that classification C is exported back to database D from another database in the replication group, that classification C must have the set of classification markings {M} when the export back to database D is imported into database D, assuming the classification C has not been modified since it was exported from database D.

Modification of a classification includes changing the set of classification markings of the classification in a database of the replication group. Modification of a classification also includes deleting the classification from an access control list. Modification of a classification does not include merely translating the set of classification markings of the classification from one classification to another.

Upholding this replication invariant allows users of the system to distinguish situations that follow the invariant from situations in which the classification is modified after it has been exported.

Upholding this invariant also allows the system to support asymmetrical classification marking translation rules between different classification schemes.

Another benefit of using origin classifications in a replication system includes the ability to replicate classifications over arbitrary peer-to-peer replication topologies including those with more than three databases.

Yet another benefit of using origin classifications in a replication system includes the ability to replicate classifications over arbitrary peer-to-peer replication topologies with no inherent limit on the number of different classification schemes that may be used by databases in the system.

Still yet another benefit of using origin classifications in a replication system includes the ability to replicate classifications over arbitrary peer-to-peer replication topologies where multiple databases in the system use the same classification scheme and some databases in the system use different classification schemes.

Still yet another benefit of using origin classifications in a replication system includes the ability to replicate classifications over arbitrary peer-to-peer replication topologies where some databases use a classification scheme for information access control and some databases do not use a classification scheme at all for information access control.

These and other benefits are provided by the techniques of using origin classifications in a replication system as described herein.

Access Control List

According to some embodiments, a classification is associated with a database information item in a database of the replication group through an access control list stored in the database. FIG. 1 is a block diagram of a possible access control list (ACL) 100 that may be associated with a database information item 140 in a database of a replication group. The ACL 100 includes an identifier 110, a set of zero or more access control items (ACI) 120, and zero or one classification 130. Typically, an ACL 100 will include at least one ACI 120 or a classification 130 or include at least one ACI 120 and a classification 130.

The identifier 110 identifies the ACL 100 uniquely and commonly in all databases of the replication group. The identifier 110 is used by a nexus during replication operations to match data representing an update to an ACL 100 received by the nexus in an export from a peer nexus with data representing the ACL 100 in the database accessed by the nexus receiving the export.

Each ACI 120 specifies a group 121 and a permission 122 of that group 121. A group 121 may also be referred to a role. The group 121 of an ACI 120 identifies a set of users. The permission 122 of the ACI 120 identifies an operation a user in the set can perform on the associated database information item 140 or an operation the user can perform on the ACL 100. Non-limiting examples of a permission 122 include read, write, owner, create, delete, etc.

According to some embodiments, if an ACL 100 has a classification 130, then a user must be authorized for each and every classification marking in the set of classification markings of the classification 130 to have any access to the associated database information item 140 or the ACL 100. Thus, the classification 130 overrides any permission 122 granted to the user that would otherwise allow the user to access the database information item 140 or the ACL 100.

The database information item 140 may be any access controlled information stored in a database of the replication group. The database information item 110 may correspond to a row, an object, a property, an attribute, a field, or a record stored in the database, as just some examples.

Example Classification Information with Origin Classifications

As mentioned above, origin classifications may be used within a replication system to facilitate translation of classification markings in accordance with the previously discussed replication invariant between peer databases of a replication group that use different classification schemes. To represent the translations, a classification associated with a database information item in a database of the replication group may have, in addition to a set of one or more classification markings that represent information access control, a set of zero or more origin classifications that represents translations of the classification as the classification is replicated between nexuses that use different classification schemes.

FIG. 2 is a block diagram of possible classification 130. In some embodiments, the classification 130 has a set of one or more classification markings 210 and a set of zero or more origin classifications 220. For ease of understanding, the database of the replication group in which the classification 130 is stored is referred to in this section as the "source database" and the nexus of the replication group that accesses the source database is referred to in this section as the "source nexus".

According to some embodiments, each classification marking 210 represents a level of authorization needed to access the database information item 140 with which classification 130 is associated in the source database. A marking 210 is specific to the particular classification scheme used by the source database. For example, one possible classification scheme may have the following possible markings: TOP SECRET (TS), SECRET (S), CONFIDENTIAL (C), RESTRICTED (R), FOR OFFICIAL USE ONLY (FOUO), among others, while another possible classification scheme may use the markings: CLASSIFIED (C) and RESTRICTED (R), among others.

In this description, for ease of understanding, a shorthand notation is used to refer to a set of classification markings once the markings of the set have been introduced by their full names. The shorthand notation consists of a character sequence enclosed by parentheses. For example, the notation (U//FOUO) may be used to refer to the set of classification markings UNCLASSIFIED and FOR OFFICIAL USE ONLY with the character sequence "//" used to separate the two abbreviated markings. A classification marking is specific to a particular classification scheme. Thus, all classification markings have an inherent classification scheme to which they belong. However, two different classification schemes can use the same classification marking.

In some embodiments, each marking 210 is character string data representing the classification marking under the classification scheme used by the source database. For example, a marking 210 may be the character string "U" or the character string "UNCLASSIFIED" to represent the classification marking UNCLASSIFIED A character string is just one possible data format for representing a classification marking 210 and other formats may be used (e.g., a binary representation, a numerical representation). Further, a marking 210 may indirectly represent a classification marking with a reference, pointer, or index key, or the like to data that actually represents the classification marking.

The set of markings 210 of the classification 130 may be more concisely represented as a formatted classification character string 211. For example, a classification with markings 210 "U" and "FOUO" may be represented as the classification string 211 "U//FOUO" where the embedded "//" character string is used as a delimiter to separate markings in the classification string 211. The character string "//" is just one example of a possible delimiters and other delimiters may be used. The classification string 211 may be stored in the source database as part of the classification 130. Alternatively, the source nexus may derive the classification string 211 from the set of markings 210 as needed. A character string is just one possible representation of the classification string 212 and other data formats for concisely representing the set of markings 210 may be used.

In some embodiments, a classification 130 is stored in the source database in response to one of two types of events. First, a classification 130 may be stored in the source database in response to creation or modification of the classification 130 in the source database. For example, a user may create a classification 130 to associate it with a database information item 140 in the source database. As another example, a user may modify the set of classification markings 210 of an existing classification 130 in the source database. When a classification 130 is stored in the source database in response to creation or modification of the classification 130, the set of origin classifications 220 may be an empty set.

Second, the classification 130 may be stored in (imported into) the source database in response to receiving a replication export from a peer nexus of the source nexus. In this case, the classification 130 imported into the source database may have a non-empty set of origin classifications 220 as described in greater detail below.

The set of origin classifications 220 represents translations between different classification schemes that the classification 130 has undergone as it traversed a replication path through the replication topology of the replication group from a first nexus to the source nexus. The set of origin classifications 220 may be conceptually viewed as a stack where the origin classification 220 at the bottom of the stack represents the set of classification markings 210 of the classification 130 as it was exported by the first nexus under the classification scheme used by the first nexus, the next highest origin classification 220 in the stack represents the set of classification markings 210 of the classification 130 as it was exported by a second nexus that translated the set of classification markings 210 from the classification scheme used by the first nexus to the classification scheme used by the second nexus, and so on, up to the origin classification 220 at the top of the stack that represents the set of classification markings 210 of the classification 130 as it was exported by the peer nexus under the classification scheme used by the peer nexus.

The nexus in the replication group that exported the classification 130 with the classification markings 210 represented by an origin classification 220 is referred to herein as the origin nexus of that origin classification 220. Similarly, the database in the replication group from which the classification 130 with those classification markings 210 was exported by the origin nexus is referred to herein as the origin database of that origin classification 220. Consequently, each origin classification 220 may be viewed as being associated with an origin nexus and an origin database.

According to some embodiments, each origin classification 220 of a classification 130 may have a classification scheme field 221, one or more classification markings 224, an optional classification string field 222, and an optional rank field 223.

The classification scheme field 221 of an origin classification 220 identifies the classification scheme used by the origin nexus of that origin classification 220. More than one nexus in the replication group may use the same classification scheme. In some embodiments, the value of the classification scheme field 221 is an alphanumeric identifier. However, the value is not limited to being formatted as an alphanumeric identifier and other data formats may be used.

The classification markings 224 of an origin classification 220 are the set of classification markings 210 of the classification 130 as it was exported by the origin nexus of that origin classification 220 under the classification scheme used by the origin nexus of the origin classification 220.

The optional classification string field 222 of an origin classification 220 concisely represents the set of classification markings 224 of the origin classification. For example, the classification string field 222 may contain a classification string 211 that concisely represents the set of classification markings 224.

The optional rank field 223 indicates the order of the origin classification 220 in the stack of origin classifications 220 of the classification 130. No two origin classifications 220 in the stack can have the same rank. As an alternative to using an explicit rank field 233, the rank of an origin classification 220 in the stack may be inferred from the order of the origin classifications 220 as stored in the source database. In this description, the lowest ranked origin classification 220 is designated with a rank order of one (1), the next highest ranked origin classification 220 designated with a rank order of two (2), and so on up to the highest ranked origin classification 220 designated with a rank order of N, where N is an integer greater than or equal to one (1). However, an ordinal other than an integer may be used to convey the rank of an origin classification 220.

Example Export Methodology

An example export methodology for exporting a classification 130 from a source database of the replication group to a peer database of the replication group will now be described. The export methodology may be summarized formally as follows: given a classification C in the source database that is to be exported to the peer database where the source database uses a classification scheme $S_{source}$ and where the classification C has the set of classification markings $\{M(1)\ldots M(K)\}$, where K is greater than or equal to one (1), and has the set of ranked origin classifications $\{O(0)\ldots O(N)\}$, where N is greater than or equal to zero (0), a new origin classification is created by the source nexus: $O(N+1)=[S_{source}, REP(\{M(1)\ldots M(K)\}), N+1]$, where:

$S_{source}$ is an identifier of the classification scheme used by the source database, $REP(\{M(1)\ldots M(K)\})$ is a data representation of the set of classification markings $\{M(1)\ldots M(K)\}$, and N+1 is the rank of the new origin classification O(N+1).

Once the new origin classification O(N+1) is created, the classification C is exported with the set of ranked origin classifications $\{O(0)\ldots O(N), O(N+1)\}$.

Figure 3:
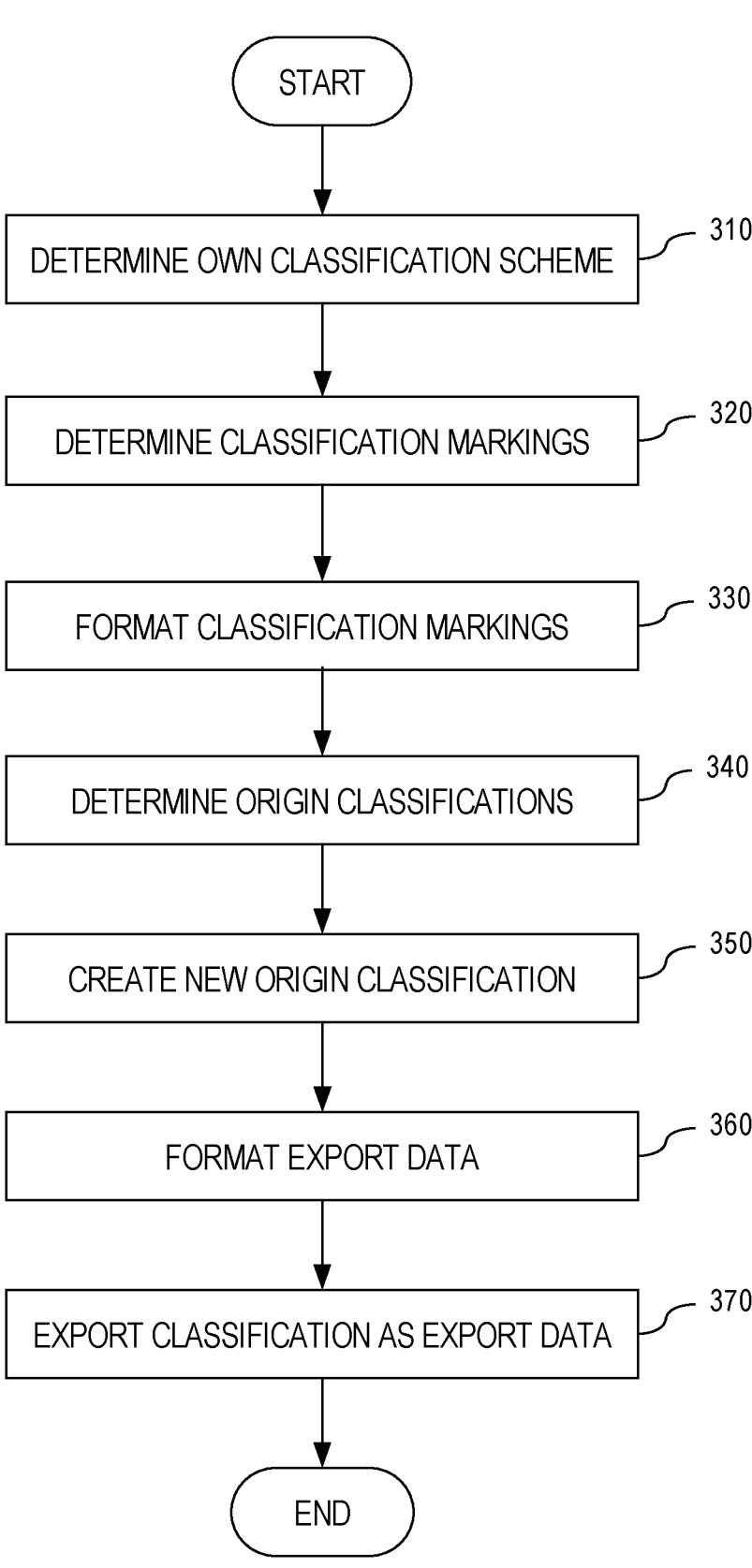
FIG. 3 is a flowchart of an example export methodology.

FIG. 3 is a flowchart of an export methodology 300 for exporting a classification 130 from a source database of the replication group to a peer database of the replication group, according to some embodiments of the invention. The methodology may be performed by a source nexus that accesses the source database. The source nexus may perform the methodology 300, for example, when replicating (exporting) the creation of, or an update to, a database information item 140 in the source database with which the classification 130 is associated in the source database, when replicating (exporting) the creation of, or an update to, the classification 130 itself in the source database, or when replicating (exporting) the creation of, or an update to, the access control list 100 that the classification 130 is a part of in the source database.

For ease of understanding, the steps of the methodology 300 are depicted and described as being performed in a certain order. However, it will be understood by those skilled in the art that where a step is not dependent on results of another step or steps, that step may be performed in a different order or performed concurrently with respect to other steps. For example, block 310 of methodology 300 may be performed after block 330. As another example, block 310, 320, 340, and 350 may be performed in parallel.

At block 310, the source nexus determines an identifier of the classification scheme used by the source database. The source nexus may be configured with the identifier, for example, by reading the identifier from the source database or reading the identifier from a configuration file or otherwise being provided the identifier by a user or other computing process through an invoke-able interface offered by the source nexus. Other manners of determining the identifier of the classification scheme may be used and the source nexus is not limited to using any particular manner. In some embodiments, the classification scheme identifier takes the form of a character string. The identifier uniquely identifies the classification scheme amongst all classification schemes used by databases in the replication group.

At block 320, the source nexus determines the classification markings 210 of the classification 130 to be exported. This may involve the source nexus reading information from the source database from among information that represents the classification 130 as stored in the source database.

At optional block 330, the classification markings 210 are formatted by the source nexus as a classification string 211. In some embodiments, each classification marking 210 is a character string representing the classification marking under the classification scheme used by the source database (e.g., "U" for UNCLASSIFIED, "R" for RESTRICTED, etc.). The classification string 211 may be produced at block 330, for example, by concatenating the classification markings 210 with a character string separator (e.g. "//") to separate classification markings in the resulting classification string 211. However, the classification string 211 is not limited to a particular data format and other data formats (e.g., a binary representation) may be used.

Alternatively, at block 320, the source nexus determines the classification string 211 by reading the classification string 211 from the source database. In this case the classification markings 210 were previously formatted as the classification string 211 and then stored in the source database. Consequently, the step of block 330 need not be performed as part of methodology 300.

At block 340, the source nexus determines the set of origin classifications 220, if any, of the classification 130 to be exported. This may involve the source nexus reading information from the source database from among information that represents the classification 130 as stored in the source database.

At block 350, the source nexus creates a new set of origin classifications that consists of the existing set of origin classifications 220, if any, plus a new origin classification as the highest ranked origin classification in the new set. In some embodiments, this new origin classification is assigned the classification scheme identifier determined at block 310, the set of classification markings 210 determined at block 320, the classification string 211 determined at block 320 or 330, and a rank of N+1 where N is the highest rank assigned to an origin classification in the set of origin classifications 220. This new origin classification is created by the source nexus only for export to the peer nexus. The source nexus at block 350 does not update the set of origin classifications 220 in the source database with this new origin classification.

At block 360, the source nexus formats the classification 130 for export as export data by using the information obtained at blocks 310-350. The export data can take any format convenient for packaging and transporting the classification 130 over a data network to the peer nexus. As one example, the export data may be formatted as extensible Markup Language (XML) or as JavaScript Object Notation (JSON). The export data may include, among other information, the identifier 110 of the access control list 100 that the classification 130 is an item of, the classification string 212 determined at block 320 or 330, and the new set of origin classifications that include the set of origin classifications 220 determined at block 340, if any, and the new origin classification created at block 350. The relative ranking of the set of origin classifications 220 is retained in the exported new set of origin classification with the new origin classification having the highest rank.

At block 370, the export data is exported to the peer nexus over one or more data networks (e.g., Local Area Networks or Wide Area Networks) in one or more network messages. The network messages are not limited to any particular network message format and can be in any network message format suitable for the requirements of the implementation at hand. Some possible non-limiting network message formats include the HyperText Message Transfer Protocol (HTTP), the Simple Object Access Protocol (SOAP), and the Simple Mail Transfer Protocol (SMTP).

Example Export Data

FIG. 4 is a block diagram of possible export data 400 representing a classification 130 exported in accordance with block 370 of the export methodology 300 of FIG. 3 by the source nexus from the source database. The export data

400 may optionally include a classification string 211 produced in accordance with block 320 or block 330. The export data 400 may also include the set of origin classifications 220 of the classification 130, determined in accordance with block 340 and include a new origin classification 420 created in accordance with block 350.

The new origin classification 420 may include a classification scheme identifier 421 corresponding to the classification scheme used by the source nexus and source database, determined in accordance with block 310. The new origin classification 420 may also include a set of classification markings 424, determined in accordance with block 320. The new origin classification 420 may optionally include a classification string 422, determined in accordance with block 320 or block 330. The new origin classification 420 may include a rank 423, determined in accordance with block 350.

According to some embodiments, an export data 400 exported at block 370 represents a creation of, or an update to, database data in the source database. In some embodiments, the created or updated database data is the classification 130 in the source database, the database information item 140 in the source database associated with the classification 130 in the source database, the access control list 100 in the source database that the classification 130 is a part of in the source database, or some combination of a creation and/or update to the classification 130, the database information item 140, and/or the access control list 100.

Translation Map and Translation Rules

According to some embodiments, each nexus in the replication group is configured with a user-defined translation map. The map is a data structure, logic, or a combination of logic and data structures that define a set of translation rules. Each translation rule maps a given set of classification markings under a given "source" classification scheme to classification markings under a given "target" classification scheme. Translation rules within a translation map need not be symmetrical. For example, a set of translation rules of a translation map can have a first rule that maps classification markings (U//FOUO) under scheme $S_1$ to classification markings (R) under scheme $S_2$ and a second translation rule that maps classification markings (R) under scheme $S_2$ to classification markings (C) under scheme $S_1$.

Example Import Methodology

An example import methodology for importing export data that represents a classification exported from a source database of the replication group to a peer database of the replication group will now be described. On import, assuming the export data satisfies pre-conditions for import into the peer database as discussed in greater detail below, if the peer database uses a different classification scheme than the source database, then the exported classification is translated to the classification scheme used by the peer database according to a set of user-defined translation rules and the translated classification is stored in the peer database.

The import methodology may be summarized formally as follows: given export data that is to be imported as classification C into the peer database that uses classification scheme Speer where the export data has a set of origin classifications $\{O(1) \ldots O(N+1)\}$, where N is greater than or equal to zero (0), potentially two iterations over the set of origin classifications $\{O(1) \ldots O(N+1)\}$ may be performed by the peer nexus. In each of the two possible iterations, the peer nexus iterates over the set of origin classifications $\{O(1) \ldots O(N+1)\}$ one-by-one from the lowest ranked origin classification O(1) to at most the highest ranked origin classification O(N+1).

In the first iteration, if the classification scheme of an origin classification O(i) matches the classification scheme of the peer database Speer, then the classification C imported into the peer database has the classification markings of that origin classification O(i) and has the set of origin classifications $\{O(1) \ldots O(i-1)\}$, if i is greater than one (1), or an empty set of origin classifications { }, if i equals one (1).

The second iteration is performed only if no classification C is imported during the first iteration. In the second iteration, if the set of user-defined translation rules used by the peer nexus defines a translation for the classification markings of an origin classification O(i) from the classification scheme of that origin classification O(i) to the classification scheme of the peer database Speer, then the classification C imported into the peer database has the classification markings under the classification of the peer database Speer that result from translating the classification markings of that origin classification O(i) from the classification scheme of that origin classification O(i) to the classification scheme of the peer database Speer according to the set of translation rules in use at the peer nexus. In addition, the classification C has the set of origin classifications $\{O(1) \ldots O(i-1)\}$. In some embodiments described in greater detail below with respect to shortest-path translations, if the second iteration is performed, the classification C imported into the peer database always has the classifications markings translated from the classification markings of the origin classification O(1) and always has the set of origin classifications $\{O(1)\}$.

Figure 5:
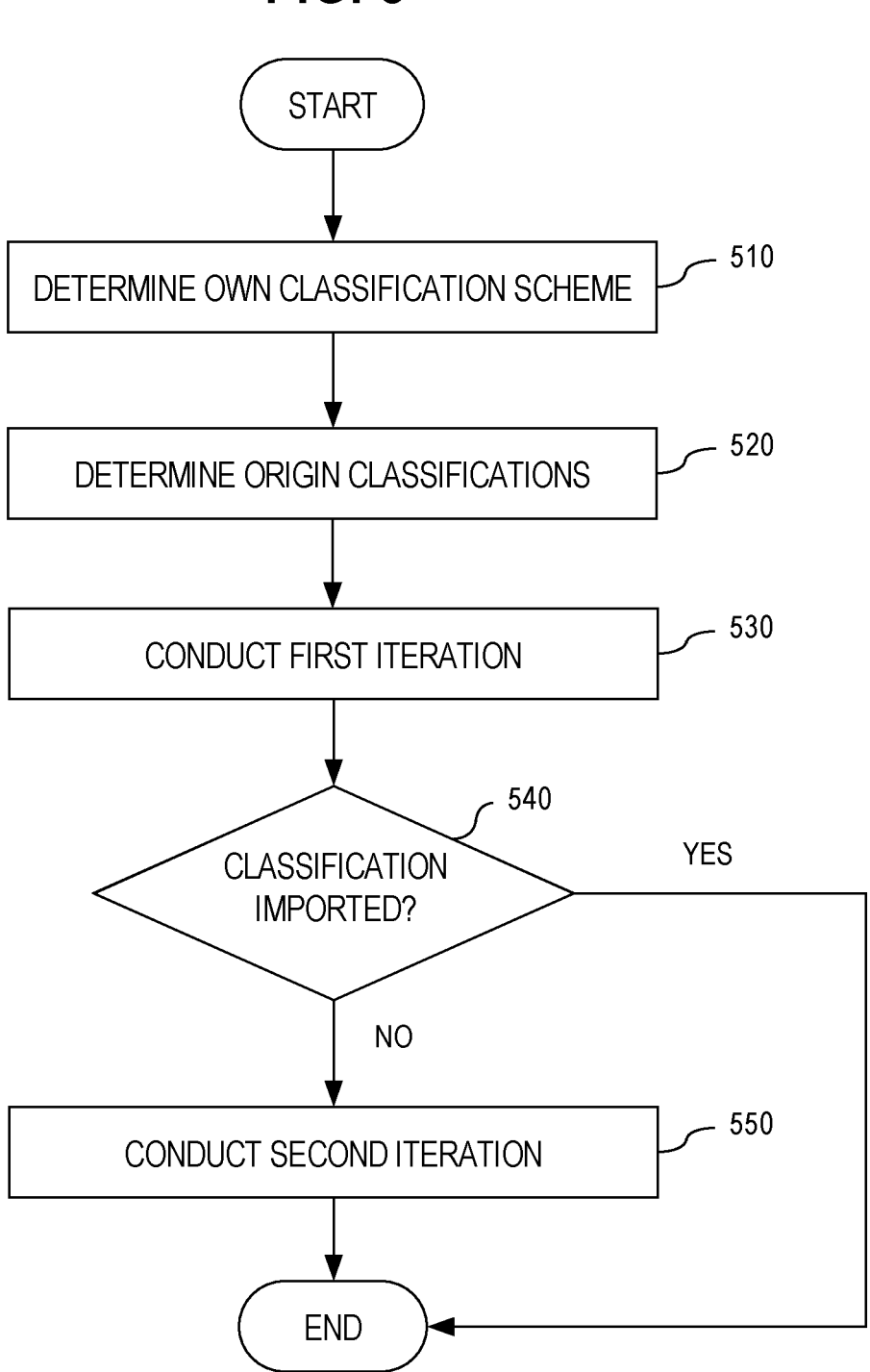
FIG. 5 is a block diagram of an example import methodology.

FIG. 5 is a flowchart of an import methodology 500 for importing export data 400 exported from a source database of the replication group to a peer database of the replication group as a classification 130. The methodology may be performed by a peer nexus that accesses the peer database after receiving the export data 400 from the source nexus.

In some embodiments, the methodology 500 is performed only after the peer nexus has determined that certain pre-import conditions have been satisfied. One such pre-import condition is that the export data 400 actually updates the peer database. In asynchronous replication, the export data 400 may not actually update the peer database because the same database information can be updated independently at the same time or at different times. For example, the export data 400 does not update the peer database if the peer database contains a later (newer) version of database data represented by the export data 400. In this case, the export data 400 is not imported into the peer database because the export data 400 represents an out-of-date version of the database data. The export data 400 also may not update the peer database if the version of the database data in the peer database, if there is one, conflicts with the version of the database data represented by the export data 400. In this case, the conflict must be resolved before the export data 400 is imported into the peer database.

In some embodiments, the peer nexus of the replication group uses a logical clock scheme for detecting causal relationships between database updates such as, for example, Lamport clocks or vector clocks, to determine whether the export data 400 does in fact update the peer database. Such determination may involve the peer nexus using the logical clock scheme to determine whether the database update represented by the export data 400 "happened before", "happened after", or neither "happened before" nor "happened after" the current version of the database data in the peer database that the export data 400 purports to update, if there is a current version of the database data in the peer database. If the update represented by the export data 400 "happened after" the current version of the database data in the peer database or if there is no current version of the database data in the peer database, then the export data 400 does actually update the peer database. If the update represented by the export data 400 "happened before" the current version of the database data in the peer database, then the export data 400 does not actually update the peer database. If the update represented by the export data 400 neither "happened before" nor "happened after" the current version of the database data in the peer database, then it is unknown whether the export data 400 updates the peer database and further action is necessary to resolve the conflict between the version of the database data represented by the export data 400 and the current version of the database data in the peer database. Depending on how the conflict is resolved (e.g., manually by a human or automatically by a heuristic), the export data 400 may still update the peer database. More information on the "happened before" and the "happened after" relations between events in a distributed computing system can be found in a paper by Leslie Lamport entitled "Time, Clocks and the Ordering of Events in a Distributed System", Communications of the ACM, 21(7), pp. 558-565 (1978), the entire contents of which is hereby incorporated by reference as if fully set forth herein.

According to some embodiments, the export data 400 includes versioning information (e.g., vector clock information or Lamport clock information) for determining whether the database update represented by the export data 400 "happened before", "happened after", or neither "happened before" nor "happened after" the current version of the database data in the peer database that the export data 400 purports to update, if there is a current version of the database data in the peer database. According to some embodiments, the database data in the peer database that the export data 400 purports to update is the current version of the classification 130 in the peer database, the current version of the database information item 140 in the peer database associated with the current version of the classification 130 in the peer database, the current version of the access control list 100 in the peer database that the classification 130 is a part of in the peer database, or some combination of the current version of the classification 130, the current version of the database information item 140, and/or the current version of the access control list 100.

In some embodiments, another pre-import condition is a successful validation of the translations of the classification 130 made by other origin nexuses in the replication group. These translations are reflected by the set of origin classifications {220, 420} of the export data 400. In particular, the peer nexus, before importing export data 400, may use its set of translation rules to verify that the translations reflected by the set of origin classifications {220, 420} are the same translations that result under the peer nexus' current set of translation rules. By doing so, the peer nexus can verify that its set of translation rules are consistent with the sets of translation rules used at the other origin nexuses in the replication group.

In some embodiments, this pre-import validation involves verifying that the set of classification markings represented by the classification string of the lowest ranked origin classification in the set of origin classifications {220, 420} translates under the set of translation rules used at the peer nexus to the set of classification markings represented by the classification string of the next highest ranked origin classification in the set of origin classifications {220, 420}, and then verifying that set of classification markings translates to the set of classification markings represented by the classification string of the next highest ranked origin classification in the set {220, 420}, and so on up to verifying that the set of classification markings represented by the classification string of the penultimate origin classification in the set {220, 420} translates to the classification markings represented the classification string of the highest ranked origin classification 420 in the stack {220, 420}. In some embodiments, the export data 400 is imported into the peer database only if this validation is successful.

For ease of understanding, the steps of the methodology 500 are described and depicted as being performed in a certain order. However, it will be understood by those skilled in the art that where a step is not dependent on results of another step or steps, that step may be performed in a different order or concurrently with respect to other steps.

At block 510, the peer nexus determines an identifier of the classification scheme used by the peer database. The peer nexus may be configured with the identifier, for example, by reading the identifier from the peer database or reading the identifier from a configuration file or otherwise being provided the identifier by a user or other computing process through an invoke-able interface offered by the peer nexus. Other manners of determining the identifier of the classification scheme may be used and the peer nexus is not limited to using any particular manner.

At block 520, the peer nexus determines the set of origin classification {220, 420} from the export data 400. For example, the export data 400 may be read and parsed and data structures representing origin classifications {220, 420} stored in a computer memory.

At block 530, the peer nexus determines whether any of the origin classifications in the set of origin classifications {220, 420} of the export data 400 correspond to an origin database that uses the same classification scheme as the classification scheme used by the peer database. Block 530 involves iterating over the set of origin classifications {220, 420} of the export data 400 one by one from the lowest ranked origin classification up to at most the highest ranked origin classification until a matching origin classification is found or until the highest ranked origin classification 420 of the set of origin classifications {220, 420} of the export data 400 is reached. A matching origin classification is found if the value of the classification scheme identifier field of the matching origin classification matches the classification scheme identifier of the peer database determined at block 510. If there is such a matching origin classification in the set of origin classifications {220, 420} of the export data 400, then according to some embodiments, the classification 130 imported into the peer database has a set of classification markings 210 that consist of the markings of the classification string of the matching origin classification. In addition, the imported classification 130 has an empty set of origin classifications 220 or the set of all origin classifications in the set of origin classifications {220, 420} of the export data 400 that are ranked lower than the matching origin classification of the export data 400, if the matching origin classification of the export data 400 is not the lowest ranked origin classification in the set of origin classification {220, 420} of the export data 400.

At block 530, if a matching origin classification in the export data 400 is found during the first iteration at block 530, then that origin classification is imported as classification 130 into the peer database as described above and the second iteration at block 550 is not performed.

On the other hand, if a matching origin classification in the export data 400 is not found during the first iteration (block 540), then a second iteration (block 550) over the set of origin classifications {220, 420} of the export data 400 is conducted.

Block 550 involves iterating over the set of origin classifications {220, 420} of the export data 400 one-by-one from the lowest ranked origin classification up to at most the highest ranked origin classification until a translatable origin classification in the export data 400 is found for which there is a translation rule in the set of translation rules used by the peer database for translating the classification string of the translatable origin classification from the classification scheme of the translatable origin classification to a set of classification markings under the classification scheme used by the peer database. If no such translatable origin classification is found in the export data 400, then the peer nexus may treat this as an error condition and determine not import the export data 400 into the peer database.

Otherwise, if a translatable origin classification is found in the export data 400 during the second iteration (block 550), then the classification 130 imported into the peer database has a set of classification markings 210 that consist of the classification markings that result from translating the classification string of the translatable origin classification in the export data 400 under the set of translation rules used by the peer database from the classification scheme of the translatable origin classification to the classification scheme used by the peer database. In addition, the imported classification 130 has a set of origin classifications consisting of just the translatable origin classification or the set of all origin classifications in the set of origin classifications {220, 420} in the export data 400 that are ranked lower than the translatable origin classification, if the translatable origin classification 421 is not the lowest ranked origin classification in the set of origin classification {220, 420} of the export data 400.

An Example of the Import and Export Methodology

Figure 6:
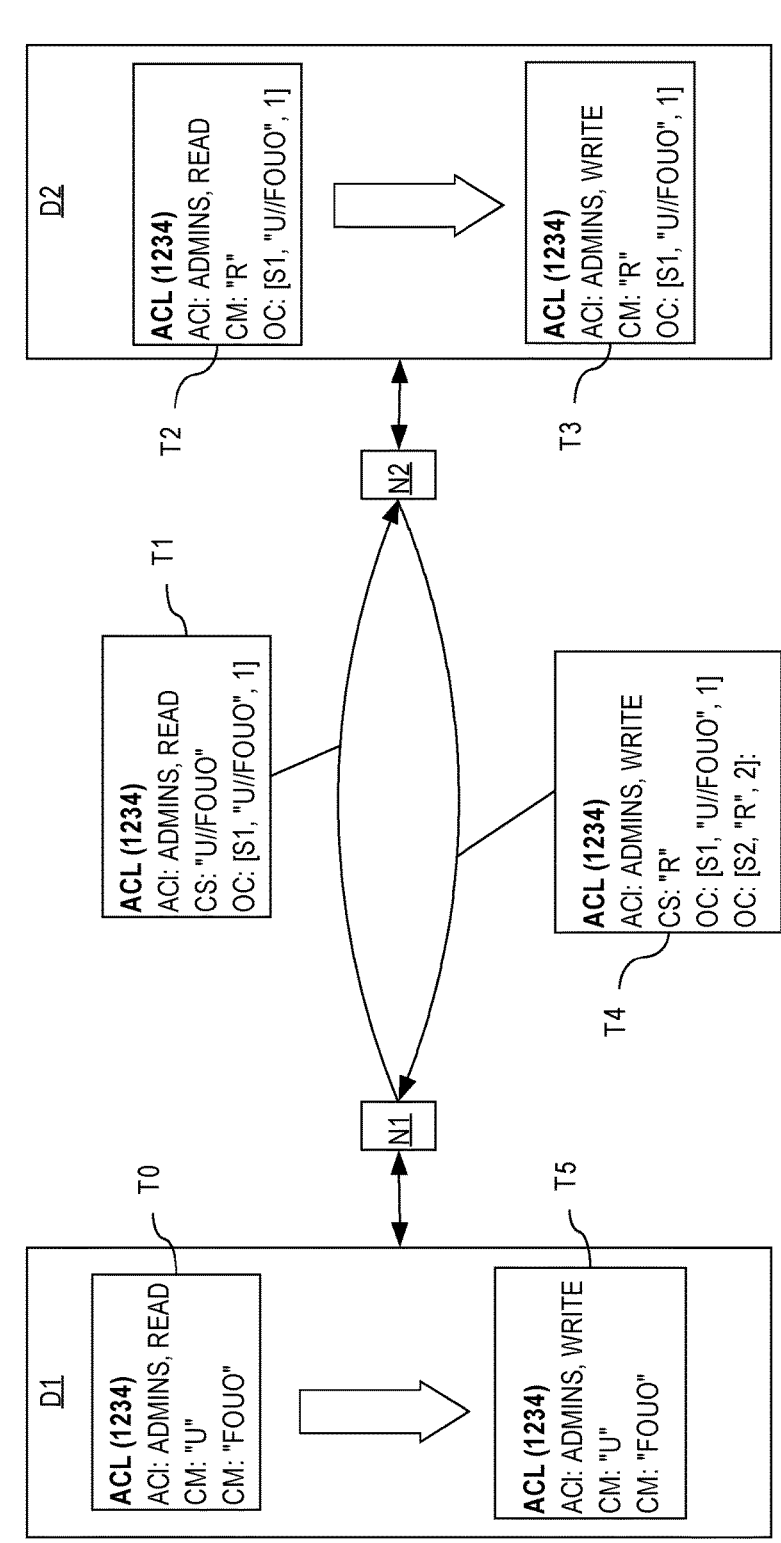
FIG. 6 illustrates an example replication system.

As an example of the export and import methodology just discussed, consider the example replication system of FIG. 6. In the system, two nexuses $N_1$ and $N_2$ access databases $D_1$ and $D_2$ respectively. Nexuses $N_1$ and $N_2$ peer with each other over one or more data networks as part of a replication group consisting of databases $D_1$ and $D_2$. In other words, nexus $N_1$ sends database information updates to database $D_1$ to nexus $N_2$ and nexus $N_2$ sends database information updates to database $D_2$ to nexus $N_1$. Databases $D_1$ and $D_2$ use different classification schemes $S_1$ and $S_2$ respectively.

The operators of the replication system have agreed on set of translation rules 601 between the two classification schemes $S_1$ and $S_2$, which happen to be asymmetric. In particular, as shown in FIG. 3, a first rule, $Rule_1$, specifies that the set of classification markings (U//FOUO) under classification scheme $S_1$ translates to the classification marking (R) under classification scheme $S_2$. A second rule $Rule_2$ specifies that a classification marking of (R) under classification scheme $S_2$ translates to (C) under classification scheme $S_1$.

Still referring to FIG. 6, according to the replication invariant, if classification C with markings (U//FOUO) under scheme $S_1$ is created in database $D_1$ and then exported from database $D_1$ by nexus $N_1$ and that classification C is not subsequently modified at database $D_1$ or database $D_2$, when the classification C is exported back to nexus $N_1$ it must contain the markings (U//FOUO) under scheme $S_1$ when it is imported by nexus $N_1$ into the database $D_1$ even if the markings (U//FOUO) were translated by nexus $N_2$ to markings under scheme $S_2$. This is shown in FIG. 6.

At time $T_0$, an access control list 100 with an identifier 110 of 1234 is created in database $D_1$ accessed by nexus $N_1$. The access control list 100 has one access control item 120 specifying that the ADMINS group 121 has a READ permission 122. In addition, the access control list 100 has a classification 130 with the set of classification markings 201 consisting of "U" and "FOUO".

As a result of the creation of the access control list 100 in database $D_1$ at time $T_0$, at time $T_1$ the access control list 100 is exported by nexus $N_1$ to nexus $N_2$ in accordance with the export methodology 300 of FIG. 3. The export data 400 contains a classification string 211 of "U//FOUO" and a set of origin classifications consisting of a new origin classification 420 with a classification scheme identifier 421 of S1, a set of classification markings 424 of "U//FOUO", and a rank 423 of 1.

At time $T_2$, nexus $N_2$ receives the export data 400 exported by nexus $N_1$ at time $T_1$ and imports the export data 400 into database $D_2$ as part of a new access control list 100 with a new classification 130 in database $D_2$ in accordance with the import methodology 500 of FIG. 5. In doing so, nexus $N_2$ translates the set of classification markings 424 of "U//FOUO" of the new origin classification 420 in the export data 400 to classification marking "R" under scheme $S_2$ according to translation rule $Rule_1$. In accordance with step 550 of the import methodology 500, the resulting classification 130 stored in the database $D_2$ has a set of classification markings 210 consisting of "R" and a set of origin classifications 220 consisting of a single origin classification 220 with a classification scheme 221 of S1, a set of classification markings 224 of "U//FOUO", and a rank 223 of 1.

As a result of the update to the access control list 100 in database $D_2$ at time $T_3$, at time $T_4$ the access control list 100 is exported by nexus $N_2$ back to nexus $N_1$ in accordance with the export methodology 300 of FIG. 3. The export data 400 contains a classification string 211 of "R" and a set of origin classifications consisting of the origin classification 220 with a classification scheme identifier 221 of S1, a set of classification markings 224 of "U//FOUO", and a rank 223 of 1 and a new origin classification 420 with a classification identifier 421 of S2, a set of classification markings 424 of "R", and a rank 423 of 2.

At time $T_5$, nexus $N_1$ receives the export data 400 exported by nexus $N_2$ at time $T_4$ and imports the export data 400 into database $D_1$ as part of updating the access control list 100 with in database $D_1$ in accordance with the import methodology 500 of FIG. 5. In accordance with step 530 of the import methodology 500, the classification 130 stored in the database $D_1$ is not updated thereby upholding the replication invariant.

Translations Map Plugin

In some embodiments, the translation map is a user-implemented logic plugin (e.g., a Dynamic Link Library (DLL) or Java Archive) to a nexus. The plugin implements a programmatic interface that the nexus can invoke when the nexus needs to perform a translation from one classification scheme to another. The following is an example of a possible programmatic interface written in the Java programming language:

```
01: package com.palantir.commons.security;
02: import java.util.Collection;
03: import java.util.Set;
04:
05: public interface NexusPeeringCrossCbacMap {
06:
07:    public ClassificationScheme getScheme(String schemeId);
08:    /**
09:     * Translates markings from origin classification scheme into markings from a destination
scheme.
10:     * @param fromScheme the scheme ID for the origin markings
11:     * @param toScheme the scheme ID for the destination markings
12:     * @param fromMarkings the markings to be translated to the destination scheme
13:     * @return the markings translated to the receiving peer's classification scheme
14:     */
15:    public Set<String>translate(String fromSchemeId, String toSchemeId, Set<String>
fromMarkings) throws InvalidClassificationSchemeException;
16:
17:    /**
18:     * Returns a set of markings given the incoming groups' permissions. This is used to
19:     * translate the ACLs coming from a non-CBAC system to a CBAC ACL. The return
translation
20:     * (peering from CBAC back to non-CBAC) should be the reverse.
21:     * @param groupAcis the access control items for the groups
22:     * @param toSchemeId the receiving peer's scheme ID
23:     * @return the markings translated from the group permissions
24:     */
25:    public Set<String> translateToMarkings(GroupLookup, Collection<AccessControlItem>
groupAcis, String toSchemeId);
26: }
```

Classification Marking Whitelist

In some embodiments, a nexus is configured with a user-defined classification marking whitelist. The classification marking whitelist is a list of classification markings under the classification scheme used by the nexus that are permitted to be exported by the nexus in export data 400. When configured with a classification marking whitelist, the nexus will not export any classification marking 210 stored in the database that the nexus accesses that are not on the whitelist. The whitelist is useful for keeping secret the existence of certain sensitive classification markings. By extension, if a classification is on a classification marking whitelist, no translation rule for translating that classification marking need exist in any translation map in the replication group. In some embodiments, the nexus will not export a classification 130 as export data 400 unless all classification markings 210 of the classification 130 are on the whitelist.

Shortest-Path Translation

In replication groups with more than two databases, it can be the case that a classification 130 is exported along two different replication paths resulting in a nexus that receives two export data 400 for the same exported classification 130 with two different stacks of origin classifications {220, 420}. In this case, the nexus receiving the two export data 400 may have two different possible translations to classification markings under the classification scheme used by the receiving nexus. According to some embodiments, the receiving nexus prefers the translation that results in the shortest stack 220 of origin classifications in the classification 130 imported into the receiving database. In other words, the receiving nexus prefers the translation corresponding to the shortest translation path. This preference is based on the expectation that the precision of translation decreases as the length of the translation path increases.

Figure 7:
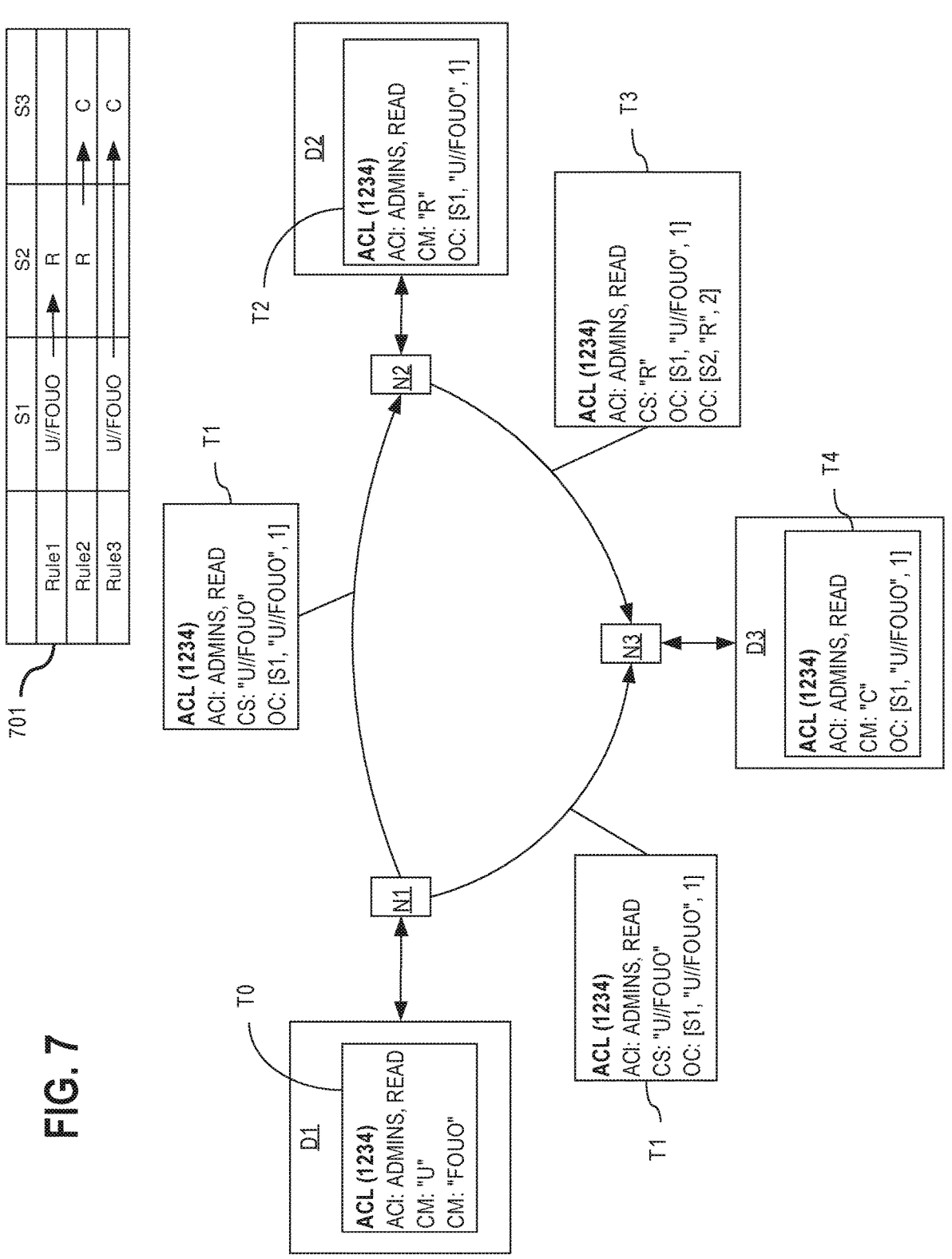
FIG. 7 illustrates an example replication system.

As an example of shortest-path translation, consider the replication system of FIG. 7. As shown, the replication group has three databases $D_1$, $D_2$, and $D_3$ accessed respectively by three nexuses $N_1$, $N_2$, and $N_3$. Database $D_1$ uses classification scheme $S_1$. Database $D_2$ uses classification $S_2$. Database $D_3$ uses classification scheme $S_3$.

According to a translation map 701 configured at all three nexuses $N_1$, $N_2$, and $N_3$, the classification markings (U//FOUO) under classification scheme $S_1$ translates to classification markings (R) under scheme $S_2$. The classification markings (R) under classification scheme $S_2$ translates to markings (C) under scheme $S_3$. The classification markings (U//FOUO) under scheme $S_1$ also translates to classification markings (C) under scheme $S_3$.

At time $T_0$, an access control list 100 with an identifier 110 of 1234 is created in database $D_1$ accessed by nexus $N_1$. The access control list 100 has one access control item 120 specifying that the ADMINS group 121 has a READ permission 122. In addition, the access control list 100 has a classification 130 with the set of classification markings 201 consisting of "U" and "FOUO".

As a result of the creation of the access control list 100 in database $D_1$ at time $T_0$, at time $T_1$ the access control list 100 is exported by nexus $N_1$ to both nexuses $N_2$ and $N_3$ in accordance with the export methodology 300 of FIG. 3. The export data 400 to each of nexuses $N_2$ and $N_3$ contains a classification string 211 of "U//FOUO" and a set of origin classifications consisting of a new origin classification 420 with a classification scheme identifier 421 of S1, a set of classification markings 424 of "U//FOUO", and a rank 423 of 1.

At time $T_2$, nexus $N_2$ receives the export data 400 exported by nexus $N_1$ at time $T_1$ and imports the export data 400 into database $D_2$ as part of a new access control list 100 with a new classification 130 in database $D_2$ in accordance with the import methodology 500 of FIG. 5. In doing so, nexus $N_2$ translates the set of classification markings 424 of "U//FOUO" of the new origin classification 420 in the export data 400 to classification marking "R" under scheme $S_2$ according to translation rule $Rule_1$. In accordance with step 550 of the import methodology 500, the resulting classification 130 stored in the database $D_2$ has a set of classification markings 210 consisting of "R" and a set of origin classifications 220 consisting of a single origin classification 220 with a classification scheme 221 of S1, a set of classification markings 224 of "U//FOUO", and a rank 223 of 1.

As a result of the creation of the access control list 100 in database $D_2$ at time $T_2$, at time $T_3$ the access control list 100 is exported by nexus $N_2$ to nexus $N_3$ in accordance with the export methodology 300 of FIG. 3. The export data 400 contains a classification string 211 of "R" and a set of origin classifications consisting of the origin classification 220 with a classification scheme identifier 221 of S1, a set of classification markings 224 of "U//FOUO", and a rank 223 of 1 and a new origin classification 420 with a classification identifier 421 of S2, a set of classification markings 424 of "R", and a rank 423 of 2.

Regardless of which export at time $T_1$ or time $T_3$ arrives at nexus $N_3$ first, nexus $N_3$ imports both exports according the shortest-path translation preference discussed above. In particular, if the export from nexus $N_2$ arrives first, because of translation rules $Rule_2$ and Rule 3, the nexus $N_3$ has a choice at block 550 of the import methodology 500 of translating the origin classification [S1, "U//FOUO," 1] or translating the origin classification [S1, "R", 2]. In accordance with the above-discussed short-path translation preference, the nexus $N_3$ will prefer to translate the lowest ranked origin classification in the export for which there is a translation rule, in this example [S1, "U//FOUO," 1] under $Rule_3$. Consequently, if the export from nexus $N_2$ arrives first, the classification 130 imported into database $D_3$ by nexus $N_3$ at time $T_4$ has a set of origin classifications 220 consisting of a single origin classification 220 with a classification scheme identifier 221 of S1, a set of classification markings 224 of "U//FOUO", and a rank 223 of 1. If, on the other hand, the export from nexus $N_1$ arrives at nexus $N_3$ first, the nexus $N_3$ translates the one origin classification in the export from nexus $N_1$ according to translation rule $Rule_3$ and imports the result into database $D_3$. As a result, regardless of which export at time $T_1$ or time $T_3$ arrives at nexus $N_3$ first, nexus $N_3$ imports the same classification 130 into database $D_3$.

Handling Multiple Shortest-Paths

According to some embodiments, to handle the possibility that a classification can be translated to multiple different shortest-paths under different translation rules, the translation map configured at each nexus in the replication group is required to have translation rules between every two classification schemes used in the replication group. As a result, there will always be at most one path of translation between classification schemes.

Figure 8:
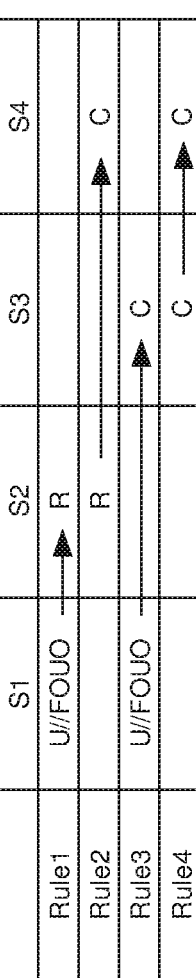
FIG. 8 is a table of an example set of translation rules.

For example, suppose a replication group has databases $D_1$, $D_2$, $D_3$, and $D_4$ accessed by nexuses $N_1$, $N_2$, $N_3$, and $N_4$ respectively and using different classification schemes $S_1$, $S_2$, $S_3$, and $S_4$ respectively. Further, suppose that each nexus in the replication group uses the set of translation rules depicted in the table of FIG. 8. The set of translation rules of FIG. 8 does not define any translation rules between classification schemes $S_1$ and $S_4$. As a result, a classification of (U//FOUO) exported separately from nexus $N_1$ to nexuses $N_2$ and $N_3$ which in turn each export the classification to nexus $N_4$ would result in two different shortest-path translated classifications at nexus $N_4$. This is undesirable because it is not clear which of the two different shortest-path translated classifications should be imported by nexus $N_4$ into database $D_4$.

In particular, since there is no rule in the set of translation rules translating classification markings (U//FOUO) under scheme S1 to classification markings under scheme S4, two different shortest-path translated classifications result at nexus $N_4$, one with the set of origin classifications {[S1, "U//FOUO", 1], [S2, "R", 2]} and the other with the set of origin classifications {[S1, "U//FOUO", 1], [S3, "C", 2]}. Even though in this example the two different shortest-path translated classifications have the same classification markings (C), it is also possible with a different set of translation rules to also have two different sets of classification markings in addition to different sets of origin classifications.

As discussed above, a solution for handling multiple different shortest-paths is to require the translation map to have translation rules between every two classification schemes used in the replication group. This requirement can be verified by a nexus when the nexus is configured with a translation map. In particular, for every set of classification markings under a classification scheme defined in the map, the nexus can verify that the translation map has a rule mapping the set of classification markings to every other classification scheme defined in the map. For example, for classification markings (U//FOUO) under scheme S1 in the set of translation rules of FIG. 8, the nexus can verify that there are rules in the map translating the classifications markings (U//FOUO) under scheme S1 to classification markings under each of schemes S2, S3, and S4. Since, in the example of FIG. 8, there is no such rule for scheme S4, the example translation map of FIG. 8 would not pass this verification.

According to some embodiments, another solution for handling multiple different shortest paths is used in the replication group that does not require the translation map to have translation rules between every two classification schemes used in the replication group. In some embodiments, a deterministic ordering of the multiple different shortest paths is used by all nexuses in the replication group and the highest or lowest ordered short path is used as a tie breaker. For example, the nexuses can sort the multiple different shortest paths in a lexical order based on classification strings or classification markings of the multiple different shortest paths.

Translating Between Nexuses that Use Classifications for Information Access Control and Nexuses that do not Use Classifications for Information Access Control According to some embodiments, origin classifications are used in a replication system to facilitate translation of classifications between a nexus that uses classifications for information access control and a nexus that does not use classifications for information access control. Each of the databases in the replication system is categorized into one of two groups. Specifically, either the database is a "classification-based access control database" (or just "CBAC database") that uses classifications for information access control or a "non-classification-based access control database" (or just "non-CBAC database") that does not use classifications for information access control. A nexus that accesses a CBAC database is referred herein to as a CBAC nexus. Similarly, a nexus that accesses a non-CBAC database is referred to herein as non-CBAC nexus.

Instead of using classification markings for information access control, a non-CBAC database may use group-based or role-based access control. For example, a database information item 140 in a non-CBAC database may be associated with an access control list 100 having a set of one or more access control items 110. Each access control item 110 may specify a group or role 122 (e.g., "EVERYONE", "ADMINISTRATORS", "EMPLOYEES", etc.) and a permission 122 (e.g., Read, Write, Create, Delete, Owner, etc.).

According to some embodiments, in addition to an access control list 100, a database information item 140 in a non-CBAC database may also be associated with a non-CBAC classification 130 that has an empty set of classification markings 210 and thus does not provide any information access control function for the database information item 140 in the non-CBAC database. However, the non-CBAC classification 130 is allowed to have a set of origin classifications 220 just like a CBAC classification 130 stored in a CBAC database to facilitate support of the replication invariant.

Exporting a Classification Originally Created in a CBAC Database from a CBAC Nexus to a Non-CBAC Nexus Peer According to some embodiments, for a classification 130 that is originally created in a CBAC database, the classification 130 is exported from a CBAC nexus to a non-CBAC nexus peer according to the export methodology 300 of FIG. 3 discussed above without modification.

Importing Export Data Representing a Classification Created in a CBAC Database into a Non-CBAC Database According to some embodiments, for export data 400 representing a classification 130 originally created in a CBAC database that is received by a non-CBAC nexus from a CBAC nexus peer, the classification 130 imported into the non-CBAC database has the same set of origin classifications 200 as the set of origin classifications {220, 420} of the export data 400, but with an empty set of classification markings 210. No translation of the origin classifications in the export data 400 is performed by the non-CBAC nexus. By doing so, the classification 130 imported into the non-CBAC database does not provide any classification-based information access control function in the non-CBAC database, but does ensure that the replication invariant can be upheld if the classification 130 is exported back to the CBAC nexus peer.

If this classification 130 imported into the non-CBAC database that was originally created in a CBAC database is subsequently exported by the non-CBAC nexus, then it is exported by the non-CBAC nexus as is, without any new origin classifications in contrast to the export methodology 300 discussed previously. This is so regardless if the peer nexus is a CBAC nexus or non-CBAC nexus. A CBAC nexus receiving such an export treats the export the same as under the import methodology 500 of FIG. 5 discussed above.

Exporting an Access Control List Created in a Non-CBAC Database from a Non-CBAC Nexus to a CBAC Nexus Peer According to some embodiments, for an access control list 100 originally created in a non-CBAC database, the access control list 100 is exported by a non-CBAC nexus to a CBAC nexus peer with a classification string 211 that represents a translation of the set of access control items 110 of the access control list 100 to a set of classification markings under the classification scheme used by the CBAC database peer. For doing so, the non-CBAC nexus may be configured with translation rules for translating sets of access control items to sets of classification markings under the various classification schemes used by the CBAC databases that the non-CBAC nexus peers with. Only non-CBAC nexuses that peer with CBAC nexuses need be configured with translation rules and non-CBAC nexuses that peer only with other non-CBAC nexuses need not be configured with translation rules.

The export of the access control list 100 from the non-CBAC nexus includes export data 400 where the export data 400 has the classification string 211 resulting from the translation of the set of access control items 110 to the set classification markings under the classification scheme used by the CBAC database peer. Further, the non-CBAC nexus creates a new origin classification 420 and includes the new origin classification 420 as the only origin classification in the export data 400. The classification scheme identifier 421 of the new origin classification 420 is assigned a special value that indicates that the classification string 211 of the export data 400 originated at a non-CBAC nexus. The special value can be any predetermined value that does not represent an identifier of a classification scheme used by a database in the replication group.

When the access control list 100 originally created in a non-CBAC database is exported by a non-CBAC nexus to another non-CBAC nexus peer, the access control list 100 is exported without translating the set of access control items 110 to a set of classification markings and without any export data 400 representing a classification 130.

Importing Export Data Representing an Access Control List Created in a Non-CBAC Database into a CBAC Database According to some embodiments, for export data 400 exported by a non-CBAC nexus to a CBAC nexus peer where the export data 400 contains a new origin classification 420 with a classification scheme identifier 421 with the special value, then, assuming all appropriate pre-conditions for import are satisfied, the CBAC nexus imports the export data 400 as a classification 130 with a set of classification markings 210 consisting of the markings of the classification string 211 in the export data 400. Further, the imported classification 130 has a set of origin classifications 220 consisting of the new origin classification 420 with the special classification scheme identifier 421 value. If and when that imported classification 130 is exported to by the CBAC nexus, either to a CBAC nexus peer or a non-CBAC nexus peer, it is exported in accordance with the export methodology 300 discussed above. If that export is received by a non-CBAC nexus peer, the origin classification with the special classification scheme identifier value in the export signals to the non-CBAC nexus to discard the classification information in the export and import just the access control list information into the non-CBAC database, thereby upholding the replication invariant for the access control list that originated in a non-CBAC database.

Example Replication System Environment

Figure 9:
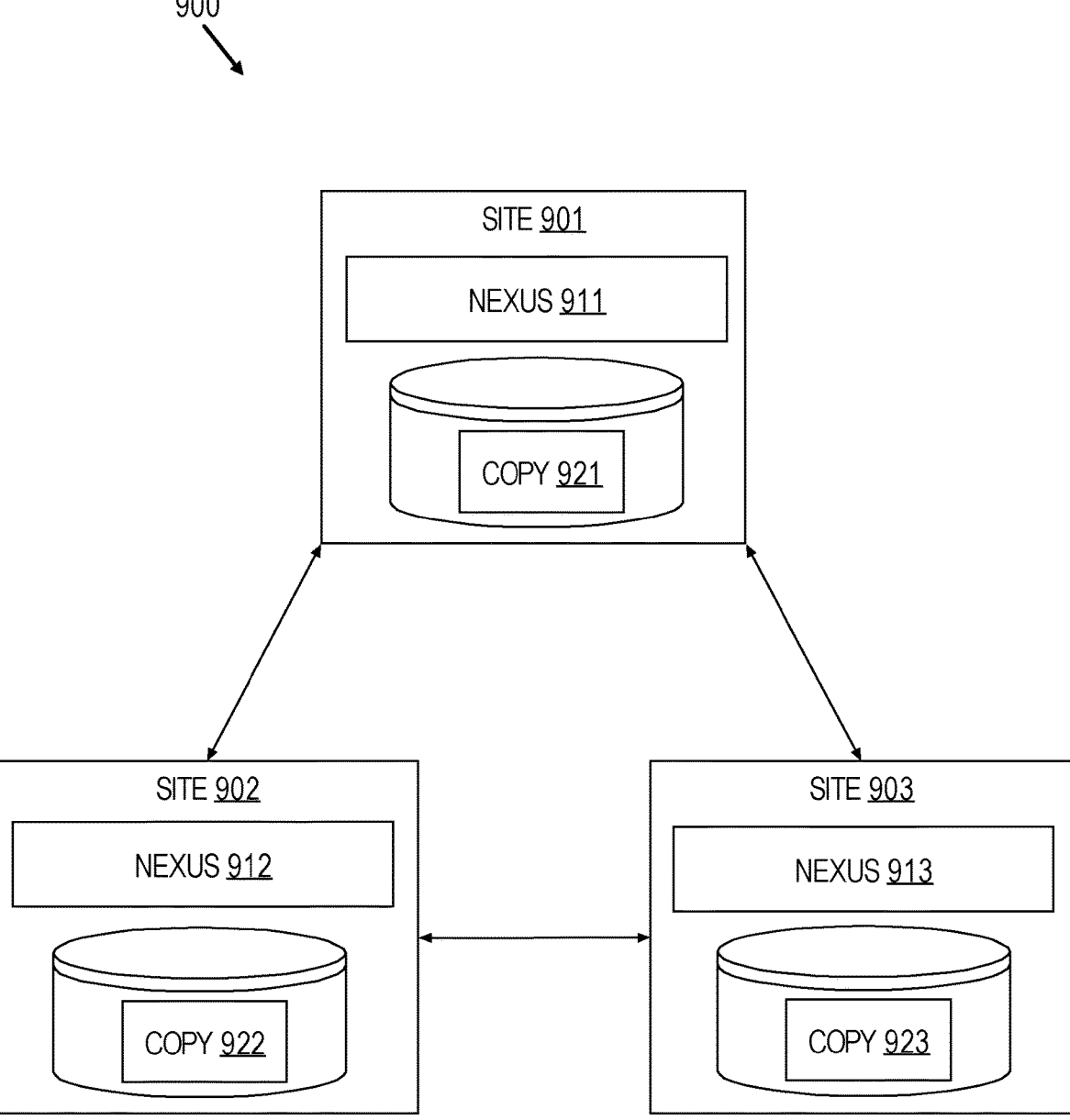
FIG. 9 is a block diagram of an example replication system environment in which embodiments of the present invention may be implemented.

FIG. 9 is a block diagram of an example replication system environment 1000 for use in sharing information between nexuses that use different classification schemes for information access control. In environment 900, replication sites 901, 902, and 903 are coupled through one or more data networks such as the Internet, one or more wide area networks (WANs), one or more local area networks (LANs), one or more network communication buses, or some combination thereof. It is not necessary that a highly or continuously available data network exist between replication sites and the data network(s) connecting any two sites may only be periodically available. Further, one or more of the sites may not be connected to any other site in the system. In this case, replication data may be transported to and from these sites manually using portable media or a portable media device as such as a Compact Disc (CD), a Digital Versatile Disc (DVD), Universal Serial Bus (USB) flash device, etc.

Each site 901, 902, and 903 may have at the site one or more networked computing devices (e.g., computer system 1000 of FIG. 10) such as one or more workstation computers, server computers, laptop computers, mobile computing devices, or combinations thereof connected to each other via one or more data networks. Further, while only three sites are shown in FIG. 9, the environment 900 may comprise tens, hundreds, or even thousands of geographically distributed sites.

Sites 901, 902, and 903 each have copies 921, 922, and 923 of the same body of data. The body of data may be, for example, one or more tables in a relational database. However, embodiments of the invention are not limited to relational databases and any type of database capable of supporting the techniques described herein may be used.

With respect to that particular body of data, nexus 901 may be configured to asynchronously propagate to site 902 changes made to copy 921, and asynchronously propagate to site 903 changes made to copy 921. Similarly, site 902 may be configured to asynchronously propagate to site 901 changes made to copy 922, and asynchronously propagate to site 903 changes made to copy 922. Site 903 may be configured to asynchronously propagate to both sites 901 and 902 changes made to copy 923. However, it is not necessary that each site be configured to propagate changes made to its copy of the body of data to every other site. In other words, a full-meshed replication topology is not required to implement embodiments of the invention and partially-meshed, cascading, and other topologies may be used.

As system 900 employs an asynchronous replication scheme, each copy 921, 922, and 923 of the body of data is loosely consistent with the other copies. That is, each copy may diverge from time to time such that at any given moment one copy's view of the body of data may be different from another copy's view of the body of data. In the absence of new changes, the copies are expected to eventually become consistent with one another. Thus, as well as being loosely consistent with one another, the copies 922, 922, 923 can also be said to be eventually consistent.

Environment 900 also contains nexuses 911, 912, and 913 implementing techniques described herein for sharing information between nexuses that use different classification schemes for information access control. In some embodiments, a nexus is implemented as one or more computer software programs, one or more field programmable logics, hard-wired logic, or some combination thereof.

Sample Computer System

Figure 10:
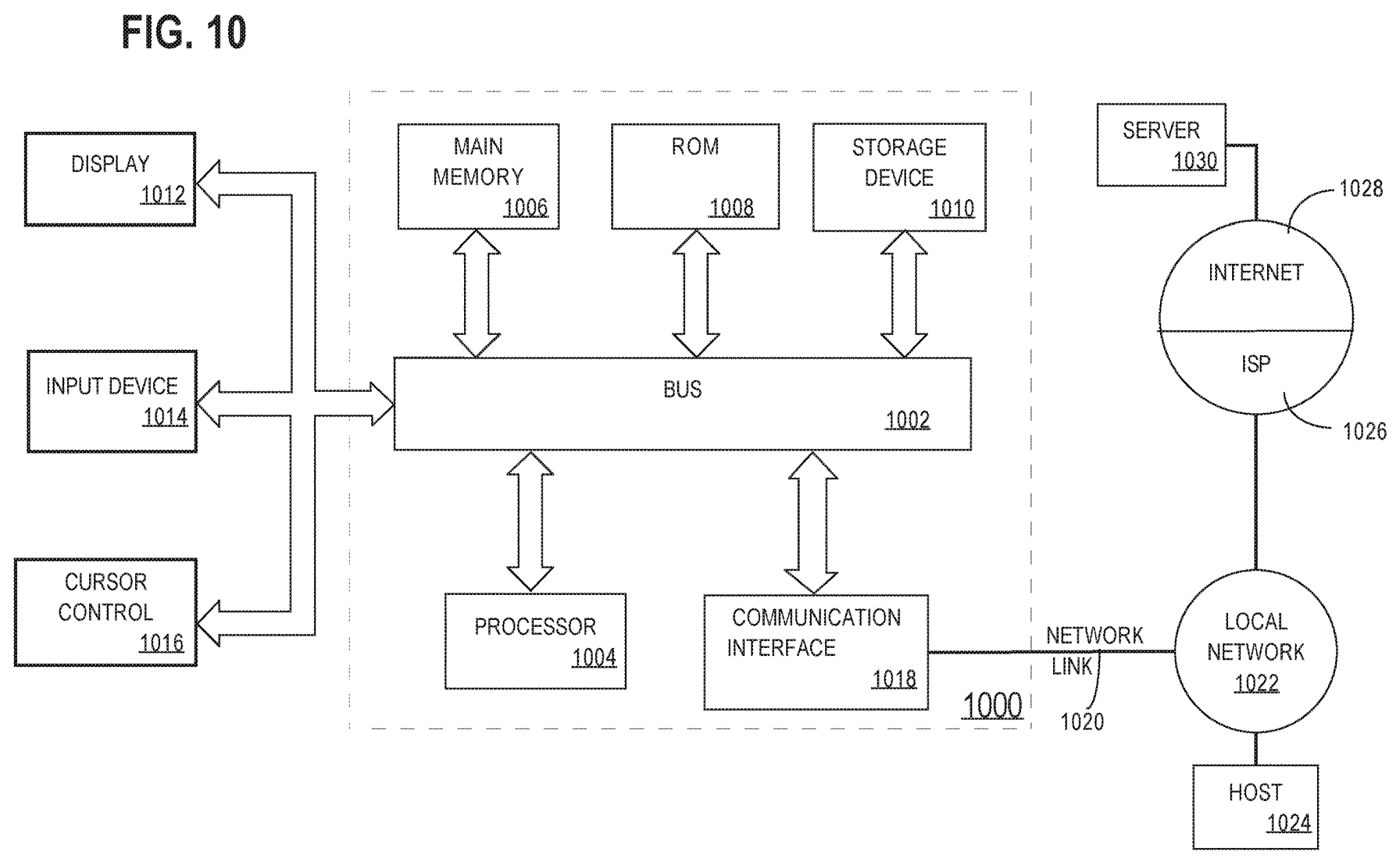

FIG. 10 is a block diagram that illustrates a computer system 1000 upon which embodiments of the present invention may be implemented. Computer system 1000 includes a bus 1002 or other communication mechanism for communicating information, and one or more hardware processors 1004 coupled with bus 1002 for processing information. A hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor(s) 1004. Main memory 1006 also may be used for storing temporary variables or other intermediate information during execution of instructions to be executed by processor(s) 1004. Such instructions, when stored in non-transitory media accessible to processor(s) 1004, render computer system 1000 into a special-purpose computing device that is customized to perform the operations specified in the instructions. For purposes of this description, main memory 1006 includes any non-volatile memory used to implement virtual memory.

Computer system 1000 may further include a read only memory (ROM) 1008 or other static storage device coupled to bus 1002 for storing static information and instructions for processor(s) 1004. One or more storage device(s) 1010, such as magnetic disks, optical disks, or solid-state drives, may be provided and coupled to bus 1002 for storing information and instructions.

Computer system 1000 may be coupled via bus 1002 to a display 1012, such as a liquid crystal display (LCD), for displaying information to a computer user. One or more input device(s) 1014, including alphanumeric and other keys, a touch panel, physical buttons, a mouse, a trackball, a cursor control device, or other input device may be coupled to bus 1002 for communicating information and command selections to processor(s) 1004. Where an input device 1014 is a touch panel, the touch panel may be physically integrated with the display 1012, for example as a resistive or capacitive sensing touch panel overlay on an LCD screen, for detecting the presence and location of touch within the display 1012 area.

Computer system 1000 may implement the techniques described herein using customized hard-wired logic, one or more ASICs or FPGAs, firmware and/or program logic which in combination with the computer system causes or programs computer system 1000 to be a special-purpose machine. The techniques herein may be performed by computer system 1000 in response to processor(s) 1004 executing one or more sequences of one or more instructions contained in main memory 1006. Such instructions may be read into main memory 1006 from another storage medium, such as storage device(s) 1010. Execution of the sequences of instructions contained in main memory 1006 causes processor(s) 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device(s) 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor(s) 1004 for execution. For example, the instructions may initially be carried on a magnetic disk or solid-state drive of a remote computer. The remote computer can load the instructions into its dynamic memory and send the instructions over wired (e.g., twisted pair, coaxial cable, optical fiber, etc.) or wireless (e.g., microwave, satellite, cellular, radio, etc.) networks. A network communications device local to computer system 1000 can receive the data on the network and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the instructions. The instructions received by main memory 1006 may optionally be stored on storage device(s) 1010 either before or after execution by processor(s) 1004.

Computer system 1000 also includes one or more communication interface(s) 1018 coupled to bus 1002. Communication interface(s) 1018 sends and receives electrical, electromagnetic, or optical signals that carry digital data streams representing various types of information. Communication interface(s) 1018 provides a two-way data communication coupling to a network link 1020 that is connected to a wired or wireless local network 1022. For example, communication interface(s) 1018 may include a modem, an integrated services digital network (ISDN) card, an Ethernet card, a cable modem, a satellite modem, an IEEE 802.11 or other Wireless Local Area Network (WLAN) interface, a 3G, 4G, or other cellular network interface, or other network interface for communicating on wired or wireless local network 1022.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program instructions, through the network(s), network link 1020 and communication interface(s) 1018. In the Internet example, a server 1030 might transmit a requested instructions for an application program through Internet 1028, ISP 1026, local network 1022 and communication interface(s) 1018.

The received instructions may be executed by processor(s) 1004 as it is received, and/or stored in storage device(s) 1010, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:

obtaining export data representing a first classification in a first database that is to be imported into a second database, the first classification including a first set of classification markings that correspond to a first classification scheme identifier of the first database and that determine access to the first database and including a first set of origin classifications in a set of databases, each origin classification of the first set of origin classifications including a classification scheme identifier and a set of classification markings of a respective database;

determining that a specific origin classification of the first set of origin classifications has a specific classification scheme identifier matching a second classification scheme identifier of the second database;

importing the specific origin classification into the second database as an imported classification.

2. The computer-implemented method of claim 1, each of the first set of origin classifications further including a rank, the determining comprising iterating over the first set of origin classifications in an order of increasing ranks until the specific origin classification is found.

3. The computer-implemented method of claim 1, the imported classification including the set of classification markings included in the specific origin classification.

4. The computer-implemented method of claim 2, the imported classification including a subset of the first set of origin classifications having lower ranks than the specific origin classification.

5. The computer-implemented method of claim 1, further comprising verifying that translations reflected by the first set of origin classifications are the same translations that result under a set of translation rules for the first database, the importing being performed in response to a successful result of the verifying.

6. The computer-implemented method of claim 5, each of the first set of origin classifications including a rank and a specific set of classification markings, the verifying comprising checking the specific set of classification markings in an order of increasing ranks.

7. The computer-implemented method of claim 1, the importing being subject to asymmetric translation rules between classification markings corresponding to the first classification scheme identifier and classification markings corresponding to the second classification scheme identifier.

8. The computer-implemented method of claim 1, before the obtaining:

exporting a second classification corresponding to the second classification scheme identifier from the second database to the first database, wherein a first translation rule is applied to translate one or more classification markings in the second classification before the second classification is imported into the first database.

9. The computer-implemented method of claim 1, further comprising:

obtaining additional export data representing a third classification in a third database that is to be imported into the second database, the third classification including a third set of classification markings that correspond to a third classification scheme identifier and that determine access to the third database and including a third plurality of origin classifications;

determining that a particular origin classification of the third plurality of origin classifications has a particular classification scheme identifier matching the second classification scheme identifier of the second database;

judging that an update was made to a second classification corresponding to the second classification scheme identifier after the second classification was exported;

rejecting the additional export data.

10. The computer-implemented method of claim 1, further comprising:

obtaining additional export data representing a third classification in a third database that is to be imported into the second database, the third classification including a third set of classification markings that correspond to a third classification scheme identifier and that determine access to the third database and including a third plurality of origin classifications;

determining that a particular origin classification of the third plurality of origin classifications has a particular classification scheme identifier matching the second classification scheme identifier of the second database;

judging that a version of a second classification corresponding to the second classification scheme identifier has a conflict with a version of the particular origin classification;

resolving the conflict before importing the particular origin classification into the second database.

11. One or more computer-readable non-transitory storage media storing instructions which, when executed by one or more processors, cause execution of a method, the method comprising:

obtaining export data representing a first classification in a first database that is to be imported into a second database, the first classification including a first set of classification markings that correspond to a first classification scheme identifier of the first database and that determine access to the first database and including a first set of origin classifications in a set of databases, each origin classification of the first set of origin classifications including a classification scheme identifier and a set of classification markings of a respective database;

determining that a specific origin classification of the first set of origin classifications has a specific classification scheme identifier matching a second classification scheme identifier of the second database;

importing the specific origin classification into the second database as an imported classification.

12. The one or more computer-readable non-transitory storage media of claim 11, each of the first set of origin classifications further including a rank, the determining comprising iterating over the first set of origin classifications in an order of increasing ranks until the specific origin classification is found.

13. The one or more computer-readable non-transitory storage media of claim 11, the imported classification including the set of classification markings included in the specific origin classification.

14. The one or more computer-readable non-transitory storage media of claim 12, the imported classification including a subset of the first set of origin classifications having lower ranks than the specific origin classification.

15. The one or more computer-readable non-transitory storage media of claim 11, the method further comprising verifying that translations reflected by the first set of origin classifications are the same translations that result under a set of translation rules for the first database, the importing being performed in response to a successful result of the verifying.

16. The one or more computer-readable non-transitory storage media of claim 15, each of the first set of origin classifications including a rank and a specific set of classification markings, the verifying comprising checking the specific set of classification markings in an order of increasing ranks.

17. The one or more computer-readable non-transitory storage media of claim 11, the importing being subject to asymmetric translation rules between classification markings corresponding to the first classification scheme identifier and classification markings corresponding to the second classification scheme identifier.

18. The one or more computer-readable non-transitory storage media of claim 11, before the obtaining:

exporting a second classification corresponding to the second classification scheme identifier from the second database to the first database, wherein a first translation rule is applied to translate one or more classification markings in the second classification before the second classification is imported into the first database.

19. The one or more computer-readable non-transitory storage media of claim 11, the method further comprising:

obtaining additional export data representing a third classification in a third database that is to be imported into the second database, the third classification including a third set of classification markings that correspond to a third classification scheme identifier and that determine access to the third database and including a third plurality of origin classifications;

determining that a particular origin classification of the third plurality of origin classifications has a particular classification scheme identifier matching the second classification scheme identifier of the second database;

judging that an update was made to a second classification corresponding to the second classification scheme identifier after the second classification was exported;

rejecting the additional export data.

20. The one or more computer-readable non-transitory storage media of claim 11, the method further comprising:

obtaining additional export data representing a third classification in a third database that is to be imported into the second database, the third classification including a third set of classification markings that correspond to a third classification scheme identifier and that determine access to the third database and including a third plurality of origin classifications;

determining that a particular origin classification of the third plurality of origin classifications has a particular classification scheme identifier matching the second classification scheme identifier of the second database;

judging that a version of a second classification corresponding to the second classification scheme identifier has a conflict with a version of the particular origin classification;

resolving the conflict before importing the particular
origin classification into the second database.

* * * * *